United States Patent
VanBlon et al.

(10) Patent No.: US 10,965,863 B2
(45) Date of Patent: Mar. 30, 2021

(54) CHANGING SETTINGS BASED ON A FINGERPRINT

(71) Applicant: LENOVO (Singapore) PTE. LTD., New Tech Park (SG)

(72) Inventors: Russell Speight VanBlon, Raleigh, NC (US); Robert James Kapinos, Durham, NC (US); Scott Wentao Li, Cary, NC (US); Robert James Norton, Jr., Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 96 days.

(21) Appl. No.: 16/178,088

(22) Filed: Nov. 1, 2018

(65) Prior Publication Data
US 2020/0145576 A1 May 7, 2020

(51) Int. Cl.
| | | |
|---|---|---|
| G06F 3/0481 | (2013.01) | |
| H04N 5/232 | (2006.01) | |
| G06K 9/00 | (2006.01) | |
| G06F 21/32 | (2013.01) | |

(52) U.S. Cl.
CPC ....... *H04N 5/23216* (2013.01); *G06F 3/0481* (2013.01); *G06F 21/32* (2013.01); *G06K 9/00006* (2013.01)

(58) Field of Classification Search
CPC ........ G06F 21/32; G06F 3/042; G06F 3/0481; H04W 52/0254; H04N 5/23216; G06K 9/00006
USPC ................... 1/1; 345/173; 382/313; 715/767
See application file for complete search history.

(56) References Cited

U.S. PATENT DOCUMENTS

| | | | | |
|---|---|---|---|---|
| 2003/0044090 A1* | 3/2003 | Miyashita | ......... | H04W 52/0254 382/313 |
| 2010/0225607 A1* | 9/2010 | Kim | ........................ | G06F 3/042 345/173 |
| 2015/0135108 A1* | 5/2015 | Pope | ..................... | G06F 3/0481 715/767 |
| 2017/0351850 A1* | 12/2017 | Jin | ......................... | G06F 21/32 |

* cited by examiner

*Primary Examiner* — Abdul-Samad A Adediran
(74) *Attorney, Agent, or Firm* — Kunzler Bean & Adamson

(57) ABSTRACT

Apparatuses, methods, systems, and program products are disclosed for changing settings based on a fingerprint. An apparatus includes a fingerprint sensor, a processor, and a memory that stores code executable by the processor. The memory stores code executable by the processor to detect a fingerprint using the fingerprint sensor. The memory stores code executable by the processor to determine that an actively executing application comprises a setting associated with the detected fingerprint. The memory stores code executable by the processor to change the setting for the actively executing application associated with the detected fingerprint.

20 Claims, 5 Drawing Sheets

CHANGING SETTINGS BASED ON A FINGERPRINT

FIELD

The subject matter disclosed herein relates to application settings, and more particularly relates to changing application settings based on a fingerprint.

BACKGROUND

Applications executing on a computing device may have different settings or modes that can usually be set using an interface such as a graphical interface. If an application is needed quickly (e.g., taking a picture with a camera), however, it can be difficult to locate, using the interface, which settings to change, which values the setting should be, or the like in a timely manner.

BRIEF SUMMARY

An apparatus for changing settings based on a fingerprint is disclosed. The apparatus includes a fingerprint sensor, a processor, and a memory that stores code executable by the processor. In one embodiment, the memory stores code executable by the processor to detect a fingerprint using the fingerprint sensor. In some embodiments, the memory stores code executable by the processor to determine that an actively executing application comprises a setting associated with the detected fingerprint. In various embodiments, the memory stores code executable by the processor to change the setting for the actively executing application associated with the detected fingerprint.

A method for changing settings based on a fingerprint includes, in one embodiment, detecting, by a processor, a fingerprint using a fingerprint sensor operably coupled to the processor. The method, in some embodiments, includes determining that an actively executing application comprises a setting associated with the detected fingerprint. The method, in various embodiments, includes changing the setting for the actively executing application associated with the detected fingerprint.

A program product for changing settings based on a fingerprint, in one embodiment, includes a computer readable storage medium that stores code executable by a processor. In some embodiments, the executable code includes code to perform detecting a fingerprint using a fingerprint sensor operably coupled to the processor. The executable code, in certain embodiments, includes code to perform determining that an actively executing application comprises a setting associated with the detected fingerprint. The executable code, in certain embodiments, includes code to perform changing the setting for the actively executing application associated with the detected fingerprint.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
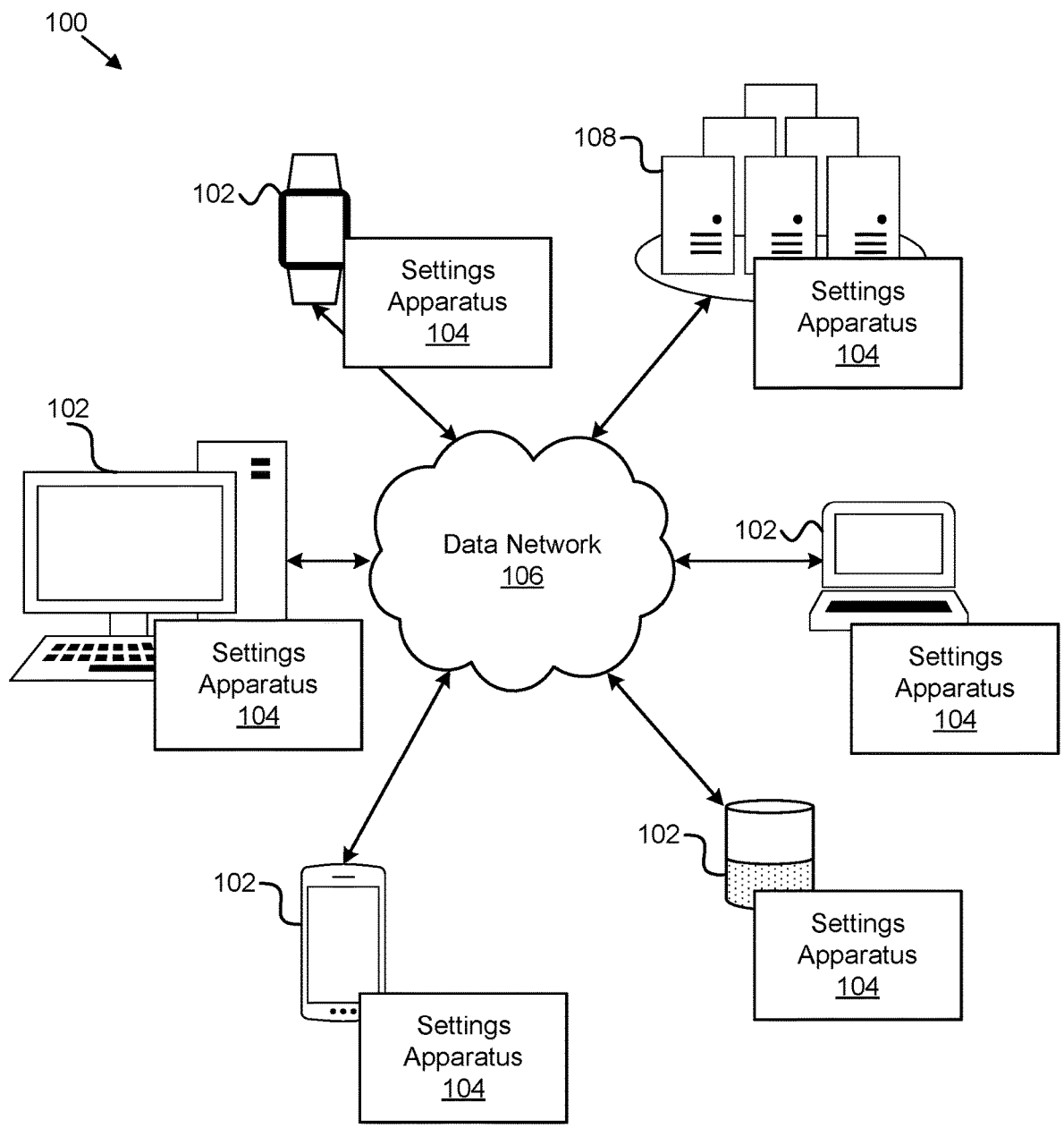
FIG. 1 is a schematic block diagram illustrating one embodiment of a system for changing settings based on a fingerprint.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus for changing settings based on a fingerprint is disclosed. The apparatus includes a fingerprint sensor, a processor, and a memory that stores code executable by the processor. In one embodiment, the memory stores code executable by the processor to detect a fingerprint using the fingerprint sensor. In some embodiments, the memory stores code executable by the processor to determine that an actively executing application comprises a setting associated with the detected fingerprint. In various embodiments, the memory stores code executable by the processor to change the setting for the actively executing application associated with the detected fingerprint.

In one embodiment, the actively executing application comprises a plurality of settings that are each configurable to be associated with a different fingerprint. In some embodiments, the code is further executable by the processor to determine that the detected fingerprint is part of a predefined sequence of fingerprints that is associated with the setting such that when the predefined sequence of fingerprints is detected, the setting is changed. In various embodiments, the code is further executable by the processor to determine that the detected fingerprint is part of a set of fingerprints that is associated with the setting such that when the set of fingerprints is detected, the setting is changed.

In one embodiment, the code is further configured to associate a fingerprint with the setting for the actively executing application on a per-user basis. The fingerprint may be associated with the setting detected based on the user who is logged into a device actively executing the application. In some embodiments, the code is further executable by the processor to receive, from a user, a selection of a setting for the actively executing application and assign a fingerprint of the user to the setting.

In one embodiment, the code is further executable by the processor to prompt the user to assign a setting for the actively executing application to the detected fingerprint in response to determining that the detected fingerprint is not associated with a setting for the actively executing application. In further embodiments, the fingerprint comprises a partial fingerprint that is associated with the setting.

In one embodiment, the code is further configured to toggle the setting for the actively executing application in response to the setting comprising multiple different values such that a different value for the setting is selected in response to detecting the fingerprint associated with the setting. In certain embodiments, the code is further configured to change the setting to a specific setting associated with the detected fingerprint.

In one embodiment, the actively executing application is a camera application for controlling a camera of an information handling device. In further embodiments, the setting for the camera application comprises one or more of a flash setting, an exposure setting, a camera mode, and an image quality.

A method for changing settings based on a fingerprint includes, in one embodiment, detecting, by a processor, a fingerprint using a fingerprint sensor operably coupled to the processor. The method, in some embodiments, includes determining that an actively executing application comprises a setting associated with the detected fingerprint. The method, in various embodiments, includes changing the setting for the actively executing application associated with the detected fingerprint.

In one embodiment, the actively executing application comprises a plurality of settings that are each configurable to be associated with a different fingerprint. In some embodiments, the method includes determining that the detected fingerprint is part of a predefined sequence of fingerprints that is associated with the setting such that when the predefined sequence of fingerprints is detected, the setting is changed.

In one embodiment, the method includes determining that the detected fingerprint is part of a set of fingerprints that is associated with the setting such that when the set of fingerprints is detected, the setting is changed. In some embodiments, the method includes associating a fingerprint with the setting for the actively executing application on a per-user basis. The fingerprint may be associated with the setting detected based on the user who is logged into a device actively executing the application.

In one embodiment, the fingerprint comprises a partial fingerprint that is associated with the setting. In certain embodiments, the method includes toggling the setting for the actively executing application in response to the setting comprising multiple different values such that a different value for the setting is selected in response to detecting the fingerprint associated with the setting.

A program product for changing settings based on a fingerprint, in one embodiment, includes a computer readable storage medium that stores code executable by a processor. In some embodiments, the executable code includes code to perform detecting a fingerprint using a fingerprint sensor operably coupled to the processor. The executable code, in certain embodiments, includes code to perform determining that an actively executing application comprises a setting associated with the detected fingerprint. The executable code, in certain embodiments, includes code to perform changing the setting for the actively executing application associated with the detected fingerprint.

FIG. 1 is a schematic block diagram illustrating one embodiment of a system 100 for changing settings based on a fingerprint. In one embodiment, the system 100 includes one or more information handling devices 102, one or more settings apparatuses 104, one or more data networks 106, and one or more servers 108. In certain embodiments, even though a specific number of information handling devices 102, settings apparatuses 104, data networks 106, and servers 108 are depicted in FIG. 1, one of skill in the art will recognize, in light of this disclosure, that any number of information handling devices 102, settings apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like. The information handling devices 102 may include one or more fingerprint sensors for detecting, identifying, authenticating, or the like fingerprints, or partial fingerprints, of a user. The fingerprint sensors may be located on the front of a device 102, on an edge of a device 102, on a back of a device 102, under a surface of the device (e.g., under a touch screen, a back cover, or the like), and/or the like.

In one embodiment, the settings apparatus 104 is configured to adjust an application setting, an operating system setting, a hardware setting, a device setting, or the like in response to detecting one or more fingerprints associated with the setting. In one embodiment, the settings apparatus 104 detects a fingerprint using a fingerprint sensor, determines that an actively executing application comprises a setting associated with the detected fingerprint, and changes the setting for the actively executing application that is associated with the detected fingerprint. The settings apparatus 104, including its various sub-modules, may be located on one or more information handling devices 102 in the system 100, one or more servers 108, one or more network devices, and/or the like. The settings apparatus 104 is described in more detail below with reference to FIGS. 2 and 3.

In one embodiment, the settings apparatus 104 improves the user's ability to quickly change application settings based on the user's fingerprint. For example, a camera application may have various exposure settings, mode settings, flash settings, or the like. With the settings apparatus 104, the various settings may be changed with a simple swipe, tap, or scan of the user's fingerprints instead of requiring the user to navigate through various menus, on-screen graphical buttons, or the like to find and select the desired setting. Instead, the settings apparatus 104 assigns or associates the setting with a fingerprint, or multiple fingerprints, and changes or selects the setting in response to detecting the fingerprint.

In various embodiments, the settings apparatus 104 may be embodied as a hardware appliance that can be installed or deployed on an information handling device 102, on a server 108, or elsewhere on the data network 106. In certain embodiments, the settings apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the settings apparatus 104 may include a power interface, a wired and/or wireless network interface, a graphical interface that attaches to a display, and/or a semiconductor integrated circuit device as described below, configured to perform the functions described herein with regard to the settings apparatus 104.

The settings apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the settings apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the settings apparatus 104.

The semiconductor integrated circuit device or other hardware appliance of the settings apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the settings apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102.

Figure 2:
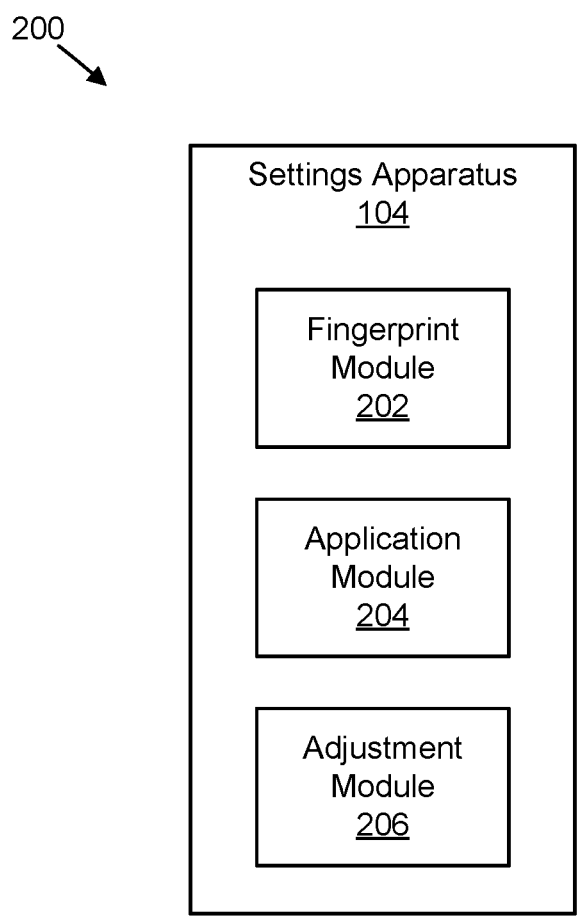
FIG. 2 is a schematic block diagram illustrating one embodiment of an apparatus for changing settings based on a fingerprint.

FIG. 2 is a schematic block diagram illustrating one embodiment of an apparatus 200 for changing settings based on a fingerprint. In one embodiment, the apparatus 200 includes an embodiment of a settings apparatus 104. The settings apparatus 104, in some embodiments, includes one or more of a fingerprint module 202, an application module 204, and an adjustment module 206, which are described in more detail below.

The fingerprint module 202, in one embodiment, is configured to detect a user's fingerprint using a fingerprint sensor of a device. As used herein, a fingerprint sensor may be a type of technology that identifies and authenticates the fingerprints of an individual. In some embodiments, the fingerprint sensor digitizes the user's fingerprint using an optical scanner, a capacitance scanner, or the like and sends the digitized fingerprint to an information handling device 102 for processing.

In certain embodiments, the fingerprint sensor may be integrated with an information handling device 102, operatively and/or communicatively coupled to an information handling device 102, or the like. For instance, the fingerprint sensor may be built into a smart phone, e.g., the fingerprint sensor may be located on the front of the phone, a side of the phone, the back of the phone, beneath a touch screen, or the like. In another example, the fingerprint sensor may be separate device that is wired (e.g., using a USB connection, an ethernet network connection, or the like) or wirelessly (e.g., using a Wi-Fi connection, a Bluetooth® connection, an NFC connection, or the like) connected to the smart phone so that it can send and receive data to/from the smart phone.

In one embodiment, the fingerprint module 202 is configured to detect a partial fingerprint, incomplete fingerprint, or the like. For example, the fingerprint module 202 may detect and distinguish between the tip of a finger or a thumb, the body of the finger or thumb, a side of a finger or thumb, or the like. Partial fingerprints may also be associated with an application setting so that portions of a fingerprint from the same finger may be used to change different application settings.

In certain embodiments, the application module 204 is configured to determine that an actively executing application comprises a setting that is associated with a detected fingerprint. As used herein, the actively executing application may include an application that has focus, an application that a user is interacting with, an application that is currently receiving user input, a graphical interface for an operating system, or the like. An application may include a camera application, an on-screen keyboard, an email application, a gaming application, a social media application, and/or any other type of application that has user-configurable settings.

For instance, in one embodiment, the application module 204 may receive the detected fingerprint, or an identifier, signature, value, key, hash, index, or the like that represents the detected fingerprint, and use it to determine, check, find, locate, identify, or the like a setting for an actively executing application that is associated with, assigned to, or the like the detected fingerprint. In such an embodiment, the application module 204 may maintain a mapping of a fingerprint to a setting for the actively executing application. The application module 204 may use an identifier, signature, value, key, hash, index, or the like that is generated based on the detected fingerprint to locate and identify in the mapping whether the actively executing application has a setting that is assigned to the fingerprint.

In one embodiment, the adjustment module 206 changes, toggles, iterates through, adjusts, reduces, increases, or the like a setting for the actively executing application in response to the application module 204 identifying the setting that is associated with the detected fingerprint.

For example, if the user is using a camera application on a smart phone and wants to change the picture setting from "AUTO" to "Sport", the user may tap the fingerprint sensor on the smart phone using the pointer finger on the right hand to provide the fingerprint for the pointer finger, which may have previously been assigned to the picture setting of the camera application (described in more detail below), to trigger changing the setting from a current setting, e.g., "AUTO" to the "Sport" setting. Settings for other applications may include changing the layout of an on-screen keyboard, changing a font style or size for an email application, changing graphic settings for a gaming application, or the like.

In one embodiment, the adjustment module 206 toggles the setting that is associated with the detected fingerprint if the setting comprises a plurality of different values. For example, a flash setting for a camera application may have three different values—"on", "off", and "auto". In this example, each time the user provides the fingerprint associated with the flash setting, the adjustment module 206 may iterate through the different flash settings, e.g., from "on" to "off" to "auto" and back to "on" and so on.

In some embodiments, the adjustment module 206 changes the application setting associated with a detected fingerprint to a specific, exact, particular, or the like setting, value for the setting, or the like. Continuing with the camera flash example above, the user's fingerprint for the pointer finger may be assigned to the flash "on" setting, the user's fingerprint for the middle finger may be assigned to the flash "off" setting, and the user's fingerprint for the ring finger may be assigned to the flash "auto" setting so that when the user provides any of the foregoing fingerprints, the adjustment module 206 changes the flash setting to the value assigned to the fingerprint instead of toggling through the different setting values.

In some embodiments, the adjustment module 206 adjusts a plurality of setting values in response to a detected fingerprint. For instance, a specific camera settings configuration may be associated or assigned to a fingerprint. For example, a camera settings configuration comprising exposure settings of "F/5.6, ⅕ sec, ISO 1600" may be assigned to a fingerprint so that when the fingerprint is detected, the adjustment module 206 changes the exposure settings to the predefined settings associated with the fingerprint.

Figure 3:
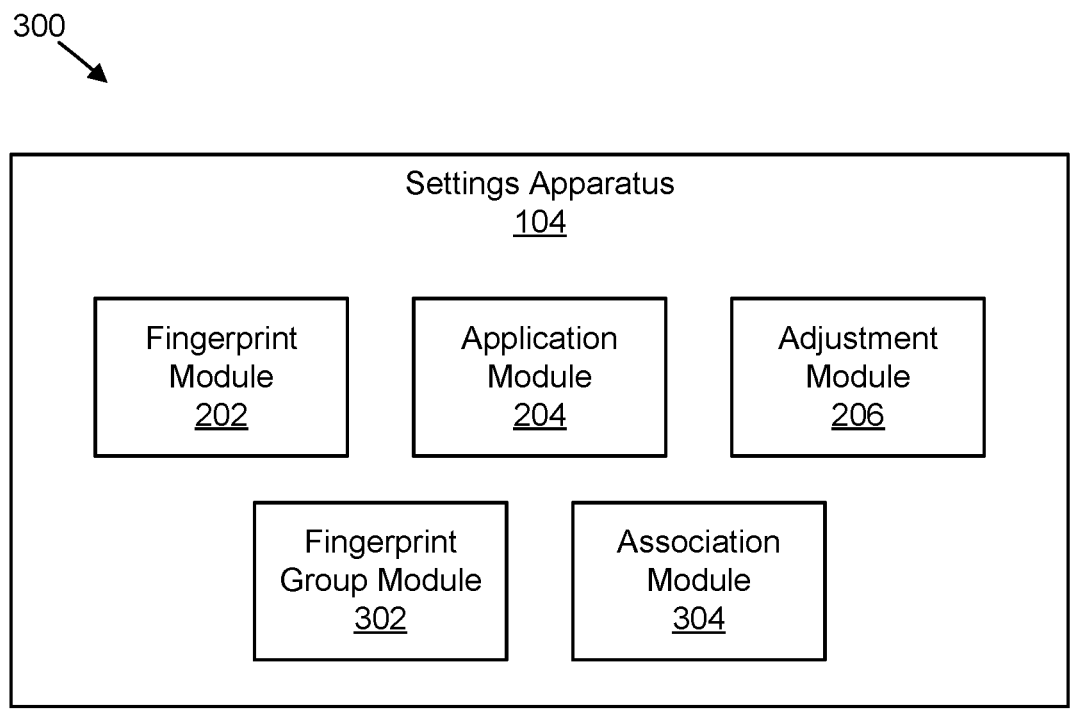
FIG. 3 is a schematic block diagram illustrating one embodiment of another apparatus for changing settings based on a fingerprint.

FIG. 3 is a schematic block diagram illustrating one embodiment of an apparatus 300 for changing settings based on a fingerprint. In one embodiment, the apparatus 300 includes an embodiment of a settings apparatus 104. The settings apparatus 104, in some embodiments, includes one or more of a fingerprint module 202, an application module 204, and an adjustment module 206, which may be substantially similar to the fingerprint module 202, the application module 204, and the adjustment module 206 described above with reference to FIG. 2. In further embodiments, the settings apparatus 104 includes one or more of a fingerprint group module 302 and an association module 304, which are described in more detail below.

The fingerprint group module 302, in one embodiment, is configured to determine whether the detected fingerprint is part of a group, sequence, order, pattern, set, or the like of a plurality of fingerprints associated with an application setting. For instance, in one embodiment, the fingerprint group module 302 determines whether the detected fingerprint is a fingerprint of a sequence, order, or pattern of a plurality of fingerprints that are assigned or associated with a setting. For example, a predefined sequence of fingerprints comprising a pointer finger, a middle finger, and the pointer finger again may be assigned to a camera flash setting to change the setting from "on" to "auto".

Thus, in the foregoing example, if the fingerprint for the pointer finger is detected, the fingerprint group module 302 may determine that the pointer finger is the first fingerprint in the predefined sequence (or in other predefined sequences of fingerprints) and may delay the adjustment module 206 from changing any application settings while the fingerprint group module 302 monitors for further fingerprints in the sequence. If a fingerprint is detected that is not in the sequence, or a fingerprint is not detected within a predefined threshold amount of time after a previous fingerprint in the sequence is detected, then the fingerprint group module 302 determines that the fingerprint is not part of a sequence or group and resets.

In another embodiment, the fingerprint group module 302 determines whether the detected fingerprint is a fingerprint of a predefined set of fingerprints that are assigned to or associated with an application setting. In such an embodiment, there may not be a predetermined order or sequence that the fingerprints in the set need to be provided in; the fingerprint group module 302 may instead determine whether a plurality of detected fingerprints are part of a predefined set, and, if so, trigger the adjustment module 206 to change the setting associated with the fingerprint set. If a fingerprint is detected that is not in the set, or a fingerprint is not detected within a predefined threshold amount of time after a previous fingerprint in the set is detected, then the fingerprint group module 302 determines that the fingerprint is not part of a fingerprint set and resets.

In some embodiments, if the fingerprint group module 302 resets after a period of time, the adjustment module 206 may consider fingerprints that were part of the potential group or set to determine if the single fingerprints are assigned to or associated with an application setting, and, if so, changes the application setting associated with the fingerprint. For example, if the fingerprint group module 302 resets after the user provided fingerprints for a pointer finger and a ring finger, the application module 204 may determine whether an application setting is associated with the pointer and/or ring fingers, and if so, the adjustment module 206 may change the corresponding application settings.

In one embodiment, the association module 304 is configured to associate, assign, or the like an application setting to one or more fingerprints. In one embodiment, the association module 304 associates a fingerprint with an application setting on a per-user basis. For example, multiple users that each have accounts on the same device can provide their own fingerprint to application settings mapping so that each user can customize which fingerprint(s) trigger a change in an application setting.

For instance, user A may change an on-screen keyboard mode using a fingerprint for a pointer finger, which user B may change the on-screen keyboard mode using a fingerprint for a thumb. The application module 204 may check a mapping, table, data structure, list, or the like of fingerprints and their corresponding application settings based on which user is logged in. In other words, the fingerprint-to-application setting mapping for each user may be stored in a storage location partitioned for each user.

In one embodiment, the association module 304 may provide an interface, menu, wizard, or the like for assigning fingerprints to application settings. For instance, the association module 304 may determine the possible assignable application settings for an application using an application programming interface ("API"), a registry, or the like, and may present the available application settings to a user, e.g., in a graphical interface, which the user can select and then provide a fingerprint, a sequence of fingerprints, a set of fingerprints, or the like that the association module 304 assigns to the selected application setting.

In certain embodiments, the association module 304 prompts the user to assign or associate an application setting with a detected fingerprint if the detected fingerprint is not associated with a setting for the actively executing application. For instance, if the user provides a fingerprint for ring finger, and the application module 204 determines that there is not an application setting for the actively executing application associated with the fingerprint, the association module 304 may prompt the user to see if the user wants to assign an application setting for the actively executing application to the fingerprint.

In such an embodiment, the association module 304 may delay the prompt until after the user is done using the actively executing application (to prevent interrupting the user) or may immediately present the prompt. Furthermore, the association module 304 may further ask if the user wants to add the fingerprint to an existing sequence or set of fingerprints for an application setting, if the user wants to create a sequence or set that includes the fingerprint for an application setting, or the like.

Figure 4:
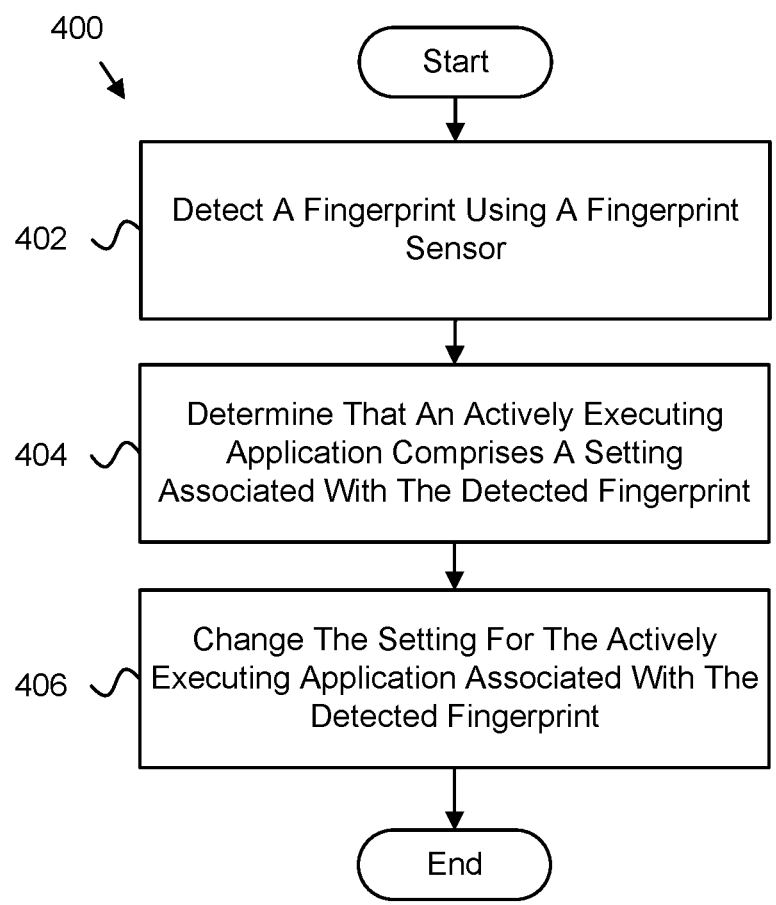
FIG. 4 is a schematic flow chart diagram illustrating one embodiment of a method for changing settings based on a fingerprint.

FIG. 4 is a schematic flow chart diagram illustrating one embodiment of a method 400 for changing settings based on a fingerprint. In one embodiment, the method 400 begins and detects 402 a fingerprint using a fingerprint sensor. In further embodiments, the method 400 determines 404 that an actively executing application comprises a setting associated with the detected fingerprint. In some embodiments, the method 400 changes 406 the setting for the actively executing application associated with the detected fingerprint, and the method 400 ends.

Figure 5:
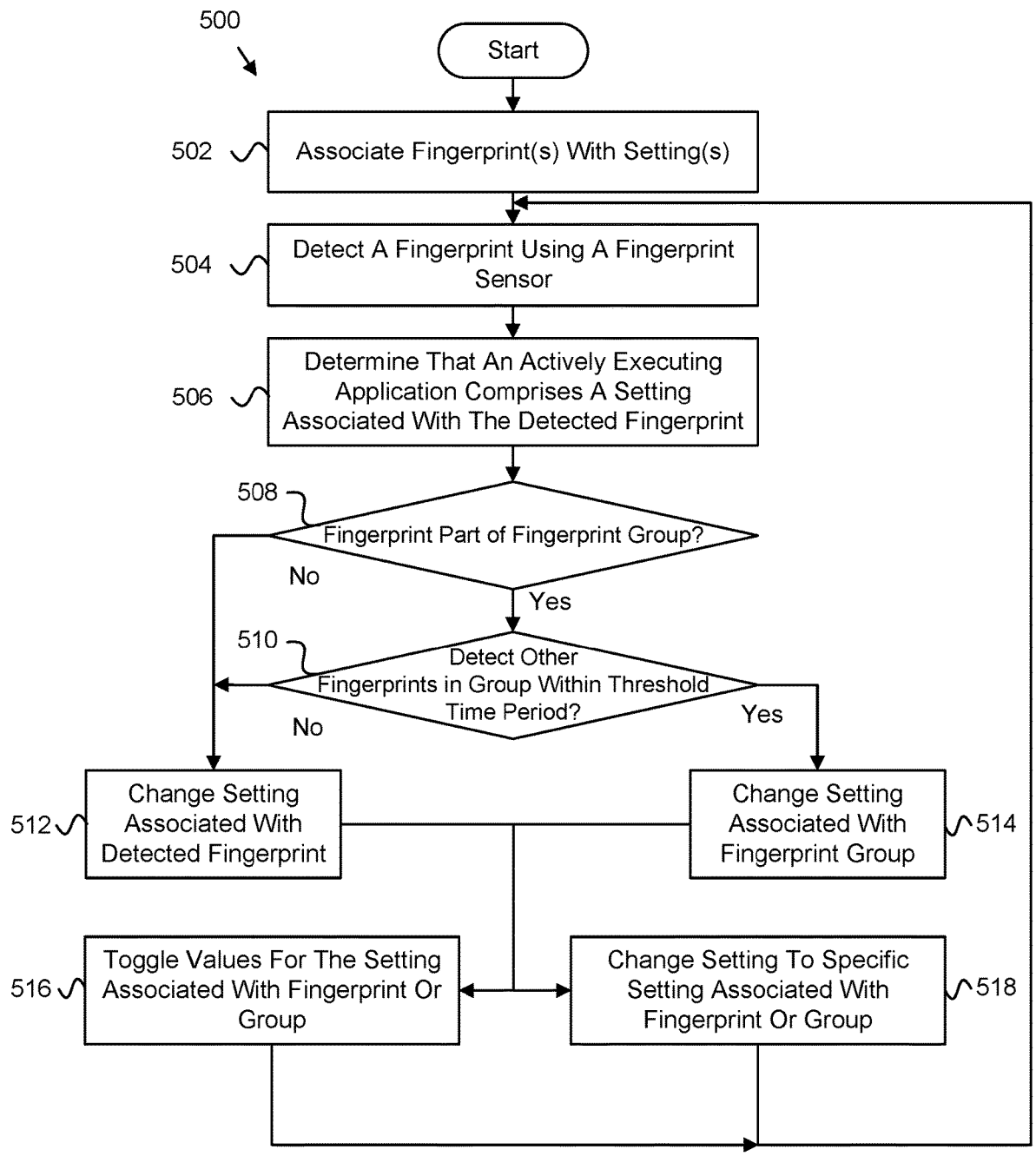
FIG. 5 is a schematic flow chart diagram illustrating one embodiment of another method for changing settings based on a fingerprint.

FIG. 5 is a schematic flow chart diagram illustrating one embodiment of another method 500 for changing settings based on a fingerprint. In one embodiment, the method 500 begins and associates 502 one or more fingerprints with an application setting. In certain embodiments, the method 500 detects 504 a fingerprint using a fingerprint sensor. In some embodiments, the method 500 determines 506 that an actively executing application comprises a setting associated with the detected fingerprint.

In one embodiment, the method 500 determines 508 whether the detected fingerprint is part of a fingerprint group. If so, the method 500, in one embodiment, determines 510 whether other fingerprints in the group have been detected within the threshold time period (e.g., 1 second, 5 seconds, 10 seconds, or the like). If so, the method 500, in some embodiments, changes 514 the setting of the actively executing application that is associated with the fingerprint group. Otherwise, the method 500 changes 512 the setting associated with the originally, detected fingerprint.

In one embodiment, to change the application setting, the method 500 may toggle 516 or iterate through different values for the setting for the actively executing application in response to the setting comprising multiple different values such that a different value for the setting is selected in response to detecting the fingerprint, or fingerprint group, associated with the setting. In further embodiments, the method 500 changes 518 the setting to a specific setting associated with the detected fingerprint or fingerprint group, and the method 500 continues detecting 504 fingerprints.

Embodiments may be practiced in other specific forms. The described embodiments are to be considered in all respects only as illustrative and not restrictive. The scope of the subject matter disclosed herein is, therefore, indicated by the appended claims rather than by the foregoing description. All changes which come within the meaning and range of equivalency of the claims are to be embraced within their scope.

What is claimed is:

1. An apparatus comprising:
   a fingerprint sensor;
   a processor; and
   a memory that stores code executable by the processor to:
   detect a partial fingerprint using the fingerprint sensor, the partial fingerprint comprising a portion of a fingerprint of a finger that is detected by the fingerprint sensor;
   determine a setting of an actively executing application that is associated with the detected partial fingerprint, the actively executing application comprising different settings that are each associated with a different portion of a fingerprint of the finger such that different portions of the fingerprint from the finger are each used to change a different application setting; and
   change the setting for the actively executing application associated with the detected partial fingerprint.

2. The apparatus of claim 1, wherein the actively executing application comprises a plurality of settings that are each configurable to be associated with a different fingerprint.

3. The apparatus of claim 1, wherein the code is further executable by the processor to determine that the detected fingerprint is part of a predefined sequence of fingerprints that is associated with the setting such that when the predefined sequence of fingerprints is detected, the setting is changed.

4. The apparatus of claim 3, wherein the code is executable by the processor to reset the sequence in response to one or more of detecting a fingerprint that is not in the sequence and not detecting a subsequent fingerprint within a predefined threshold of time.

5. The apparatus of claim 1, wherein the code is further executable by the processor to determine that the detected fingerprint is part of a set of fingerprints that is associated with the setting such that when the set of fingerprints is detected, the setting is changed.

6. The apparatus of claim 1, wherein the code is further configured to associate a fingerprint with the setting for the actively executing application on a per-user basis, the fingerprint associated with the setting detected based on the user who is logged into a device actively executing the application.

7. The apparatus of claim 1, wherein the code is further configured to toggle the setting for the actively executing application in response to the setting comprising multiple different values such that a different value for the setting is selected in response to detecting the fingerprint associated with the setting.

8. The apparatus of claim 1, wherein the code is further configured to change the setting to a specific setting associated with the detected fingerprint.

9. The apparatus of claim 1, wherein the code is further executable by the processor to receive, from a user, a selection of a setting for the actively executing application and assign a fingerprint of the user to the setting.

10. The apparatus of claim 1, wherein the code is further executable by the processor to prompt the user to assign a setting for the actively executing application to the detected fingerprint in response to determining that the detected fingerprint is not associated with a setting for the actively executing application.

11. The apparatus of claim 1, wherein the actively executing application is a camera application for controlling a camera of an information handling device.

12. The apparatus of claim 11, wherein the setting for the camera application comprises one or more of a flash setting, an exposure setting, a camera mode, and an image quality.

13. A method comprising:
    detecting, by a processor, partial fingerprint using a fingerprint sensor, the partial fingerprint comprising a portion of a fingerprint of a finger that is detected by the fingerprint sensor;
    determining a setting of an actively executing application that is associated with the detected partial fingerprint, the actively executing application comprising different settings that are each associated with a different portion of a fingerprint of the finger such that different portions of the fingerprint from the finger are each used to change a different application setting; and
    changing the setting for the actively executing application associated with the detected partial fingerprint.

14. The method of claim 13, wherein the actively executing application comprises a plurality of settings that are each configurable to be associated with a different fingerprint.

15. The method of claim 13, further comprising determining that the detected fingerprint is part of a predefined sequence of fingerprints that is associated with the setting such that when the predefined sequence of fingerprints is detected, the setting is changed.

16. The method of claim 15, further comprising resetting the sequence in response to one or more of detecting a fingerprint that is not in the sequence and not detecting a subsequent fingerprint within a predefined threshold of time.

17. The method of claim 13, further comprising determining that the detected fingerprint is part of a set of fingerprints that is associated with the setting such that when the set of fingerprints is detected, the setting is changed.

18. The method of claim 13, further comprising associating a fingerprint with the setting for the actively executing application on a per-user basis, the fingerprint associated with the setting detected based on the user who is logged into a device actively executing the application.

19. The method of claim 13, further comprising toggling the setting for the actively executing application in response to the setting comprising multiple different values such that a different value for the setting is selected in response to detecting the fingerprint associated with the setting.

20. A program product comprising a non-transitory computer readable storage medium that stores code executable by a processor, the executable code comprising code to perform:

detecting a partial fingerprint using a fingerprint sensor, the partial fingerprint comprising a portion of a fingerprint of a finger that is detected by the fingerprint sensor;

determining a setting of an actively executing application that is associated with the detected partial fingerprint, the actively executing application comprising different settings that are each associated with a different portion of a fingerprint of the finger such that different portions of the fingerprint from the finger are each used to change a different application setting; and changing the setting for the actively executing application associated with the detected partial fingerprint.

\* \* \* \* \*